United States Patent [19]

Yeaple

[11] 4,038,499

[45] July 26, 1977

[54] STEREOPHONIC PILLOW SPEAKER SYSTEM

[75] Inventor: Ronald Norman Yeaple, Fairport, N.Y.

[73] Assignee: Yeaple Corporation, Rochester, N.Y.

[21] Appl. No.: 654,576

[22] Filed: Feb. 2, 1976

[51] Int. Cl.[2] .......................... H04M 1/04; H04R 5/02

[52] U.S. Cl. ................................................ 179/146 H

[58] Field of Search .................... 179/146 H; 181/141, 181/145, 153

[56] References Cited

U.S. PATENT DOCUMENTS

| | | | |
|---|---|---|---|
| 2,464,435 | 3/1949 | Conradt | 179/146 H X |
| 3,944,020 | 3/1976 | Brown | 179/146 H X |

*Primary Examiner*—William C. Cooper

*Attorney, Agent, or Firm*—Cumpston & Shaw

[57] ABSTRACT

A stereophonic pillow speaker system is disclosed wherein first and second baffle frames and loudspeakers thereon derive near field effects at points proximal to the speakers in response to electrical signals from an amplifier. Also included are pillow means for providing comfort to a listener's head between the loudspeakers and to isolate mechanical vibrations between the baffle frames and a listener's head when the ears of the listener are in registry with the near field effect. The system includes equalizer circuit means for tailoring of the electrical signals from the amplifier to achieve a high quality sound, to compensate for deficiencies of the loudspeakers at extreme low and high frequencies, and to substantially eliminate out-of-phase rumble.

18 Claims, 8 Drawing Figures

STEREOPHONIC PILLOW SPEAKER SYSTEM

RELATED APPLICATION

Applicant's U.S. Pat. No. 3,870,834, entitled "Personal Stereophonic Speaker System", discloses a personal stereophonic speaker system which employs a near field effect and includes a rigid curved baffle frame supporting two opposed loudspeakers. The loudspeakers are in spaced relationship for receiving a listener's head between the two loudspeakers.

The present application discloses a stereophonic pillow speaker system wherein first and second loudspeakers are mounted on discrete first and second baffle frames, respectively, which are mechanically isolated from each other by a resilient foam material such as resilient plastic foam and adapted to receive a listener's head between the two baffle frames. The said first and second loudspeakers are mounted on the said first and second baffle frames, respectively, to derive first and second near field effects proximal to their respective first and second loudspeakers. The present system includes equalizer circuits which compensate for deficiencies of a speaker at the extreme low and high frequencies to provide a high quality sound and substantially eliminate out-of-phase rumble.

BACKGROUND OF THE INVENTION

1. Field of the Invention

The present invention relates to a loudspeaker apparatus and more particularly to a stereophonic pillow speaker system.

2. Prior art

Pillows which include loudspeakers are well known in the art as disclosed in patents, some of which are: U.S. Pat. No. 3,290,450 to Majoros, U.S. Pat. No. 3,384,719 to Lanzara, U.S. Pat. No. 3,416,804 to Christie, and U.S. Pat. No. 3,621,155 to Pruitt.

While such prior art attempts to provide comfort in listening to sound emanating from a loudspeaker, they do have certain disadvantages, difficulties and problems. For example, in Lanzara U.S. Pat. No. 3,384,719, physical contact between the listener's head and a Masonite supporting sheet which supports two loudspeakers is required to provide direct transmission of relatively low frequency vibrations to the back of a listener's head. While this direct mechanical coupling and transmission may be good for the transmission of bass vibrations, it has been proven to be relatively uncomfortable and unnatural to the listener.

In Majoros, U.S. Pat. No. 3,290,450, two speakers in a foam rubber pillow-like support yield to a user's head when placed thereon to direct the two loudspeakers and channels of sound therefrom towards the mastoid area of the listener's head. This has a disadvantage in that the user's head must be placed equidistant from the loudspeakers prior to resting on the pillow, otherwise the user's head may come directly upon a speaker and therefore create a problem of sound direction and comfort. Moreover, Majoros' speaker system does not produce near field effects.

There are many difficulties with such prior art pillow loudspeaker systems including the requirement of direct mechanical contact between the listener's head and vibrational transmission means. As disclosed in the patent to Lanzara, prior art requires relatively large loudspeakers to achieve acoustic baffling. Such large loudspeakers have the disadvantages of poor high frequency response, poor high frequency dispersion, greater cost, greater weight and larger physical size, all of which are adverse characteristics in a pillow speaker system.

Further, none of the prior art loudspeakers for pillows compensate for deficiencies of the loudspeakers at the extreme low or high frequencies, nor do they reduce out-of-phase rumble without sacrificing bass response. Accordingly, there is a pressing need for an improved stereophonic pillow speaker system which employs the near field effect and does not require mechanical transmission from the loudspeakers to the listener's head and solves the aforesaid difficulties and problems.

It is an object of the present invention to provide an improved stereophonic pillow speaker system.

It is yet another object of the present invention to provide an improved stereophonic pillow speaker system for generating bass response through airborne acoustics rather than by mechanical vibrational transmission.

It is still another object of the present invention to provide an improved stereophonic pillow speaker system which has means for reducing out-of-phase rumble and has good bass response.

It is a further object of the present invention to provide an improved comfortable and high quality sound stereophonic pillow speaker system.

SUMMARY OF THE INVENTION

Briefly described, a stereophonic pillow speaker system in accordance with the invention includes first and second baffle frames, each of which includes at least one loudspeaker mounted thereon in cooperative relationship to derive near field effects proximal to the loudspeaker and being spaced to receive a listener's head between the first and second baffle frames so that the listener's ears are in registry with the near field effects. The stereophonic pillow speaker system further includes resilient means for isolating mechanical vibrations between the first and second baffle frames and a listener's head when disposed between the first and second baffle frames. The resilient means also comfortably supports the listener's head. The system also includes equalizer circuit means connected between the loudspeakers and the output channels of an amplifier for reducing out-of-phase rumble and to compensate for deficiencies of the loudspeakers, particularly at the extreme low and high frequencies.

There are many advantages of this invention which are set forth in a portion of the description of the preferred embodiment entitled "Advantages".

BRIEF DESCRIPTION OF THE DRAWINGS

The above and other objects and advantages of the present invention will become apparent from the following detailed description taken in conjunction with the attached drawings wherein.

DESCRIPTION OF THE PREFERRED EMBODIMENT

Inasmuch as the present invention may be employed with a number of loudspeakers or speakers and associated audioelectronic equipment, the description of the present invention will be directed in particular to elements forming part of, or to elements cooperating more directly with, a personal stereophonic loudspeaker system in accordance with the invention. It should be understood that parts not specifically shown or described are selectable from those known in the art.

Figure 7:
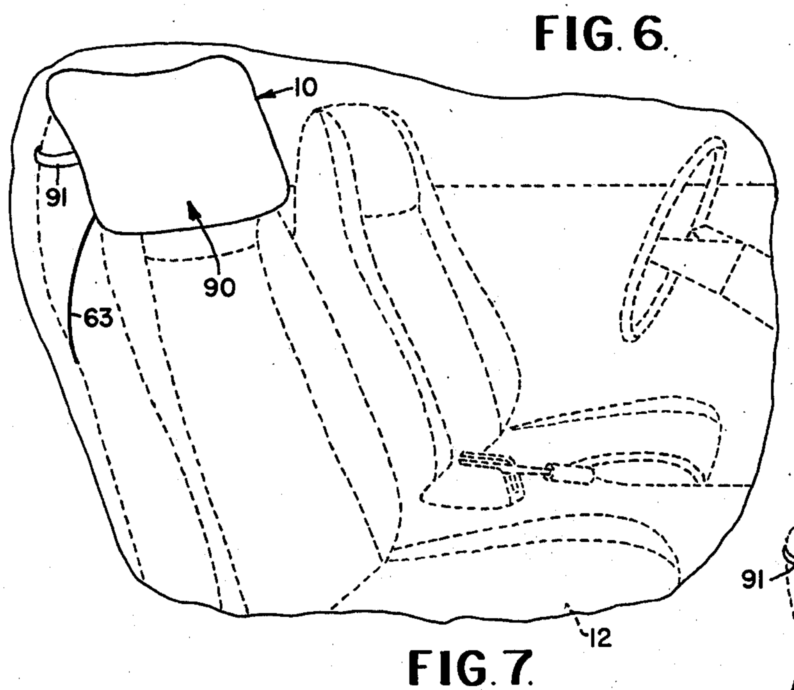
FIG. 7 shows a stereophonic pillow speaker system being utilized in an automobile.

Referring first to FIGS. 1, 2, 7 and 8 of the drawings, a stereophonic pillow speaker system 10 of the present invention may be used in a horizontal position on a bed, sofa or the like (not shown), or in a vertical position on the back of a seat 12 of an automobile as shown in FIG. 7, or on the back 13 of a chair 14. Since the stereophonic pillow speaker system utilizes the near field effect, it may be used in the presence of other persons without disturbing those present, since sound pressure tends to drop rapidly with increasing distance from the source.

Referring now to FIGS. 1–4, a stereophonic pillow speaker system 10 in accordance with a preferred embodiment of the invention is shown.

The stereophonic pillow speaker system 10 includes first and second baffle frames **20*a*, 20*b*, loudspeakers 21*a*, 21*b*, equalizer circuit means 60 (FIG. 6), and resilient pillow means 22.**

Figure 3:
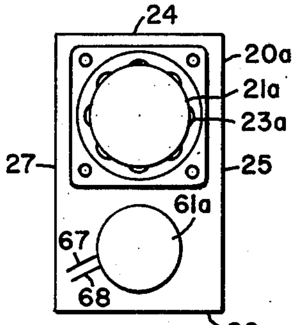
FIG. 3 is a rear view of a baffle frame with loudspeaker and equalizer circuit means utilized in the stereophonic pillow speaker system of the present invention.
Figure 4:
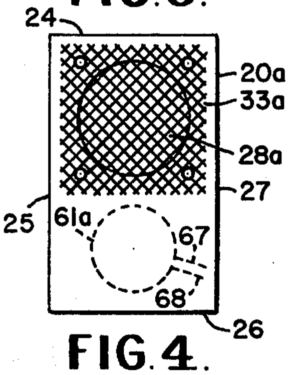
FIG. 4 is a front view of the baffle frame of FIG. 3 showing the loudspeaker and protective screening.

The first and second baffle frames **20*a*, 20*b* and loudspeakers 21*a*, 21*b*** are similar to each other and have corresponding numerals with the suffix letter *a* or *b* added. Baffle frame **20*a* and loudspeaker 21*a* are shown in FIGS. 3 and 4. The first baffle frame 20*a* is made of a relatively thin board of plastic, wood or composition-board such as Masonite of sufficient strength to support loudspeaker 21*a* and one channel circuit 61*a* of the equalizer circuit means 60. The first baffle frame 20*a* is of a size that the back wave 31*a* of sound being generated by the back 23*a* of the loudspeaker 21*a* must travel around any one of the edges 24, 25, 26, 27 of the baffle frame 20*a* to the front 28*a* of the loudspeaker 21*a* at a point 29*a* . The distance traveled by the backwave 31*a* is greater than the distance traveled by a frontwave 32*a* to the point 29*a* to achieve a near field effect as shown in FIG. 3** to be described hereinafter.

The front **28*a* of the loudspeaker 21*a* is protected by a screen 33*a* of acoustically transparent material such as plastic screening, and is in registry with window openings 30*a*, 30*b*.**

The first and second baffle frames **20*a*, 20*b* and their corresponding loudspeakers 21*a*, 21*b* are mounted in spaced relationship in the pillow means 22 to receive a listener's head therebetween. The baffle frames 20*a* and 20*b* are tilted at an angle, preferably so that planes defining their front surfaces and the front surfaces of their respective speakers intersect at an angle $\theta$ 92 (FIG. 2) to place the speakers close to the listener's ears when the listener's head is in proper position for listening. Although the speakers could be parallel and facing each other, I have found the speakers will be properly positioned with the listener's ears in registry with the near field effects derived at points 29*a* and 29*b*** when angle $\theta$ is within the range of approximately 90° to 120°.

Pillow means 22 not only provides for the comfort of the listener's head, but also serves to isolate mechanical vibrations from the first and second baffle frames **20*a*, 20*b* and the loudspeakers 21*a*, 21*b* to the listener's head. Pillow means 22 is made of a resilient material such as polyurethane foam. Pillow means 22 may be molded of polyurethane foam in a single piece or, as shown for the preferred embodiment of the invention, may be constructed by a lower portion 35, an upper portion 36, and baffle support members 38 which are cemented along their edges. The lower portion 35 supports the baffle frames 20*a*, 20*b*, while the baffle support members 38 resiliently support the baffle frames 20*a*, 20*b* at the desired angles at the proper spacing so that the listener's head may rest between baffle frames 20*a* and 20*b* on cushioned top portion 36, which in turn is supported by cushioned lower portion 35, thereby providing a well cushioned and extremely comfortable support for the listener's head. The top portion 36 covers the baffle frames 20*a*, 20*b* and the loudspeakers 21*a*, 21*b* and provides additional comfort to the listener. The baffle support means 38 are thus cemented in place so as to support the baffle frames 20*a*, 20*b* at the angular position shown, thereby creating a pillow with a depressed center which cradles the listener's head. This configuration guides the listener's head to a position midway between the speakers. His ears are approximately at the points 29*a*, 29*b* and close (about 1½ to 2 inches) from the front surfaces 28*a*, 28*b* of the speakers 21*a*, 21*b*,** respectively. There are no rigid pieces directly under the listener's head, only resilient material, thus insuring the listener's comfort.

The entire pillow assembly is encased in a decorative, washable fabric cover 39 which has a slide fastener (not shown) along one edge to permit the decorative cover 39 to be removed for cleaning. A layer of flexible material such as cloth or plastic having high tear-strength is cemented to the lower portion 35 as shown to strength the lower portion 35 and prevent tearing.

Figure 2:
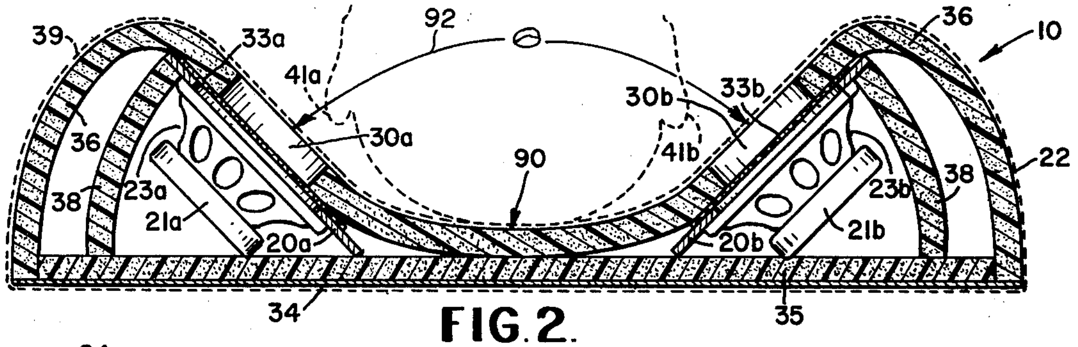
FIG. 2 is a cross-sectional view of the stereophonic pillow speaker system of FIG. 1 taken along line 2—2.
Figure 5:
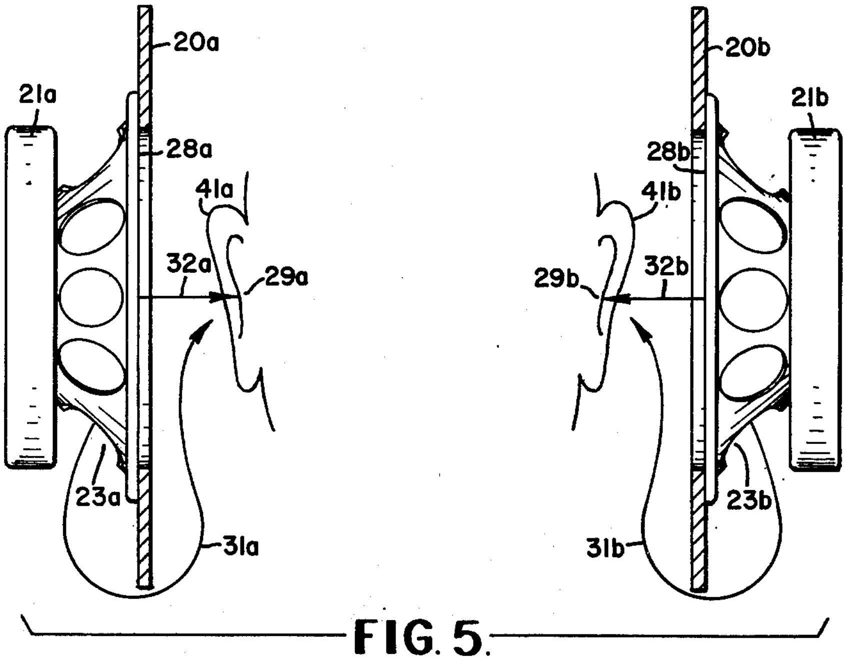
FIG. 5 is a schematic pictorial representation of loudspeakers within the stereophonic pillow speaker system mounted on baffle frames to achieve near field effects.

In accordance with the invention, the structure necessary to create a near field effect at points **29*a*, 29*b* is shown in FIG. 5. The speaker 21*a* mounted on baffle frame 20*a* is only about 1½ to 2 inches from the ear 41*a* of the listener, as shown in FIG. 2. The path length of the front wave 32*a* of the speaker 21*a* is only about 1½ inches long. The back wave 31*a* which is out-of-phase with the front wave 32*a* must travel around the edge of the baffle frame 20*a* a much longer path length. Since sound pressure tends to drop 6 db for each doubling of the path length, the intensity of the back wave 31*a*** at the listener's ear is very weak, and therefore very little cancellation of the bass frequencies occurs.

To illustrate how well this phenomenon operates, consider the following example, using path lengths which are typical of the preferred embodiment illustrated:

Front wave path length: 1½ inches

Back wave path length: 6 inches

Since the rear wave path length is four times that of the front wave, the back wave pressure at the listener's ear tends to be 12 db below the front wave pressure at the same point. In addition, the back wave at this path length is radiating into a 4 pi solid angle (versus a 2 pi solid angle for the front wave because of its much shorter path length relative to the baffle). Therefore, the back wave is down an additional 3 db at the listener's ear. Altogether, for the dimensions given, the back wave pressure will be 15 db below the front wave pressure at the listener's ear. The cancellation is about 1 part in 6, and the bass response heard by the listener is down only about 1½ db from what it would be if there were no cancellation. This difference of 1½ db is barely perceptible. Thus, baffle frames 20*a* and 20*b* act substantially like "infinite" baffles.

As a result, it is possible to provide excellent bass response, virtually without back wave cancellation, by means of the configuration shown. I have found that the maximum required ratio of backwave-path-length to frontwave-path-length is 4:1. A further increase of the ratio will be imperceptible to the listener, but will add to the physical size of the baffles, making the pillow unnecessarily bulky. The minimum ratio preferably should not be less than about 2:1. In this case, the low frequency cancellation loss is about 3.7 db. If the ratio is reduced below about 2:1, the loss in bass response will be quite noticeable to the listener.

Figure 1:
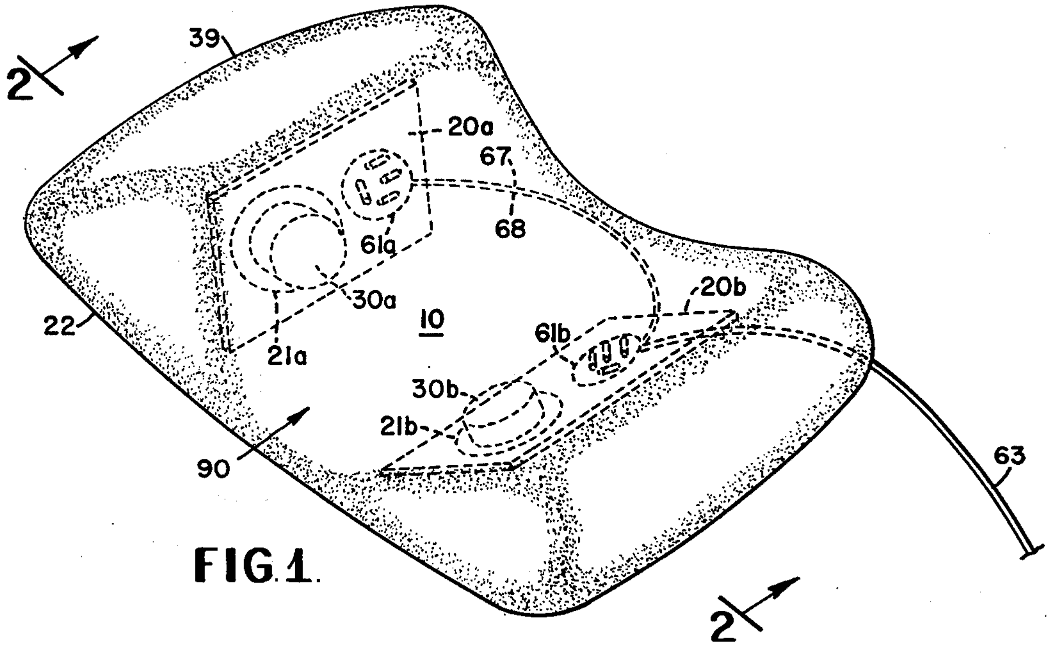
FIG. 1 is a perspective view of the stereophonic pillow speaker system.
Figure 6:
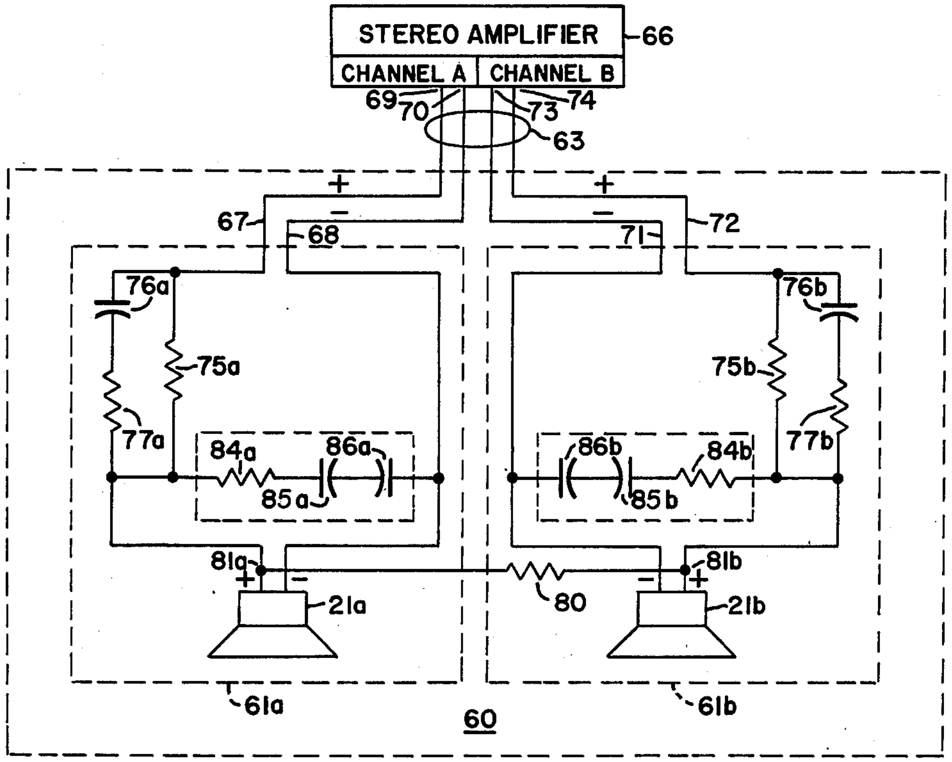
FIG. 6 is a circuit diagram of an equalizer circuit of the stereophonic pillow speaker system.

The equalizer circuit means 60 is shown in FIG. 6. The equalizer circuit means 60 is electrically connected between an amplifier 66 at output channel A and channel B and the speakers 21*a*, 21*b* by cable 63. The equalizer circuit means 60 includes two identical circuits 61*a*, 61*b*. The equalizer circuit means 60 may be located physically within the pillow system 10 as shown in FIG. 1, or it may be located external to the pillow along cable 63 or at amplifier 66.

The cable 63 includes leads 67, 68 which are connected between channel A of the stereo amplifier 66 at terminals 69, 70 and channel circuit 61*a*. Cable 63 also includes leads 71 and 72 which are connected between channel B of the stereo amplifier 66 at terminals 73, 74 and to channel circuit 61*b*.

Since channel circuits 61*a* and 61*b* are identical, elements of channel circuit 61*b* which correspond to elements of channel circuit 61*a* will have the same numerical identification except those elements of channel circuit 61*a* will have a letter suffix *a*, while elements of channel circuit 61*b* will have a letter suffix *b*.

The channel circuit 61*a* includes a resistor 75*a*, which is preferably a wire-wound power resistor, connected in series with the loudspeaker 21*a*. Resistor 75*a* performs several functions, namely:

a. It reduces the sensitivity of the system so that the amplifier volume control (not shown) can be advanced to normal settings without "blasting".
b. It protects the speaker 21*a* by absorbing a large fraction of the power output of the amplifier 66.
c. It adjusts the electromagnetic damping of the speaker 21*a*, thus allowing the bass response of the system 10 to be adjusted for optimal performance.
d. It raises the impedance of the circuitry downstream from resistor 75*a* so that the shunting components, capacitors 85*a*, 86*a* and resistor 84*a* can effectively attenuate the midrange frequencies, thereby providing flatter acoustic output from the system 10. Although capacitors 85*a* and 86*a* are preferably electrolytic and are shown as separate units, a single capacitor could be substituted therefor.

Capacitor 76*a* and resistor 77*a* partially shunt resistor 75*a* at the highest audio frequencies, thereby restoring the very high frequency acoustic output of the speaker 21*a* in the region where the speaker's high frequency response would otherwise roll off.

A resistor 80 bridges the two channel circuits 61*a*, 61*b* at input terminals 81*a* and 81*b* of speakers 21*a*, 21*b*, respectively. The resistor 80 provides a slight mixing of the left and right program material at the input terminals 81*a*, 81*b* of the speakers 21*a*, 21*b*, respectively. Because the impedance of the combination of the equalizer circuit and the loudspeaker is higher near the resonant frequency of the loudspeaker, bridging resistor 80 is relatively more effective at the bass frequencies. This greatly reduces the annoyance of out-of-phase rumble caused by vertical vibrations in the playback turntable (not shown) or sometimes even recorded in the phonograph record by vertical vibrations in the cutting lathe. There is no reduction in the system's bass response to normal in-phase low frequency program material. The value of resistor 80 can be selected to significantly reduce out-of-phase rumble without perceptibly reducing the stereo separation of the system 10.

The equalizer circuit means 60 raises the impedance of the system 10. This permits several such systems to be connected in parallel across the output terminals 69, 70, 73, 74 of the amplifier 66 without causing the combined parallel impedance of these multiple systems to drop to such a low value that the amplifier output circuitry (not shown) might be damaged.

In the operation of the stereophonic pillow speaker system 10, audio electrical input signals are applied to the equalizer circuit means 60 from the stereo amplifier 66 by way of channel A and channel B at terminals 69, 70, 73, 74. The equalizer circuit means 60 shapes the frequency response characteristic of the electrical input to the speakers 21*a*, 21*b* so as to permit optimum acoustic output from the speakers 21*a*, 21*b* at the listener's ears 41*a*, 41*b*, respectively. The speakers 21*a* and 21*b* as herein shown being mounted on the baffle frames 20*a*, 20*b*, respectively, produce the near field effects at the listener's ears 41*a*, 41*b* when the listener's ears 41*a*, 41*b* are in registry with the near field effects at points 29*a* and 29*b*.

The pillow means 22 isolate mechanical vibrations between the baffle frames 20*a* and 21*b* and also provide for the comfort of the listener. The pillow means 22 also guides the listener's head between the two spaced apart baffle frames 20*a*, 20*b* so that the listener's head may be comfortably positioned between the baffle frames 20*a*, 20*b* to allow the listener's ears 41*a*, 41*b* to be in registry with the near field effect at points 29*a*, 29*b*, respectively.

Figure 8:
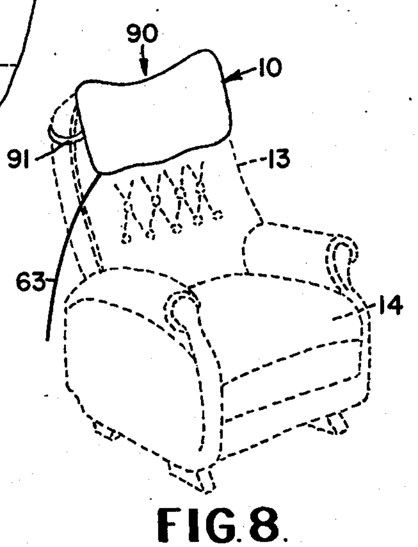
FIG. 8 shows a stereophonic pillow speaker system being utilized on a chair.

FIGS. 7 and 8 show the stereophonic pillow speaker system 10 in use on a seat 12 of an automobile and on a chair 14. The stereophonic pillow speaker system 10 in all appearances looks like a pillow, except that it has a preformed recess 90 to receive a listener's head and cable 63 extending from the pillow to the amplifier 66. Volume controls (not shown) may be added along the length of the cable 63 if desired. Also, the stereophonic pillow speaker system 10 may include a strap 91 for mounting it on the back 11 of the seat 12 or the back 13 of the seat 14.

Advantages

The described preferred embodiment of the invention in a stereophonic pillow speaker system 10 produces very high quality sound for the individual listener or to a number of listeners, each of whom may utilize one of the system 10. This is possible since each of the equalizer circuit means 60 raises the impedance of the system 10 without causing the combined parallel impedance of the system 10 to drop to such a low value that the amplifier output circuitry might be damaged.

The system 10 incorporates a bridging resistor between channels A and B of the stereo amplifier 66 to substantially reduce out-of-phase rumble while almost imperceptibly reducing stereo separation. The bridging resistor does not reduce the bass response of the system 10 to normal in-phase bass frequencies in the program material. Thus, the present invention increases the quality of sound.

A further advantage is that with the present invention, the listener does not have to press his head against the stereophonic pillow speaker system 10 to receive the bass notes—he will hear the bass even if his head is an inch or so away from the pillow system 10. Moreover, the sound field produced is stationary and does not give the sensation of being within the listener's head, as if often the case with stereo headphones.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention.

I claim:

1. A stereophonic pillow speaker system comprising:

a. a first baffle frame;

b. at least one loudspeaker mounted on said baffle frame in cooperative relationship with said baffle frame to derive a first near field effect proximal to said one loudspeaker in response to an electrical signal applied to said one loudspeaker from one channel of an amplifier;

c. a second baffle frame;

d. at least one other loudspeaker mounted on said second baffle frame in cooperative relationship with said second baffle frame to derive a second near field effect proximal to said one other loudspeaker in response to another electrical signal applied to said one other loudspeaker from another channel of said amplifier;

e. pillow means for resiliently isolating said first and second baffle frames in spaced relationship and for positioning said baffle frames at an angle relative to each other so that one ear of a listener is in registry with said first near field effect and the other ear of said listener is in registry with said second near field effect when said listener's head is disposed between said first and second baffle frames; and f. said pillow means includes resilient means for isolating mechanical vibrations from said first and second baffle frames to said listener's head.

2. The invention defined in claim 1 further including an equalizer circuit means connected between said loudspeakers and said channels of said amplifier for tailoring said electrical signals from the amplifier.

3. The invention defined in claim 1 further including an equalizer circuit means having one channel circuit which includes a resistor connected in series with one channel of said amplifier and said one of said loudspeakers and includes another channel circuit which has another resistor connected in series with the other channel of said amplifier and said other loudspeaker for protecting said loudspeakers by absorbing a portion of the power output of said amplifier.

4. The invention defined in claim 3 wherein said equalizer circuit means includes a bridging resistor between said speakers for providing mixing of the electrical input signals from said channels of said amplifier for reducing any out-of-phase rumble delivered by said amplifier.

5. The invention defined in claim 1 further including an equalizer circuit means having one channel circuit which includes a capacitor and a resistor connected in series with each other and in parallel with said one of said loudspeakers for flattening the acoustic output of said one of said loudspeakers, and includes another channel circuit which has another capacitor and another resistor connected in series with each other and in parallel with said other loudspeaker for flattening the acoustic output of said other loudspeaker.

6. The invention defined in claim 1 wherein said first and second baffle frames and said pillow means form a recess for receiving a listener's head therein between said first and second baffle frames.

7. The invention defined in claim 1 further including a first acoustical window mounted on said first baffle frame in registry with said one loudspeaker and a second acoustical window mounted on said second baffle frame in registry with said one other loudspeaker.

8. The invention defined in claim 1 further including an equalizer circuit means having one channel means circuit connected between said one channel of said amplifier and said one loudspeaker and a second channel circuit means connected between said other channel of said amplifier and said one other loudspeaker wherein i. said first channel circuit means includes a first series resistor connected between said one channel of said amplifier and said one loudspeaker and a first capacitor connected in parallel with said first series resistor for shunting said first series resistor, and ii. said second channel circuit means includes a second series resistor connected between said one other channel of said amplifier and said one other loudspeaker and a second capacitor connected in parallel with said second series resistor for shunting said second series resistor.

9. The invention defined in claim 1 further including means for mounting said system on the back of a chair.

10. The invention defined in claim 1 further including means for mounting said system on the back of an automobile seat so that said near field effect and said loudspeakers are in registry with a listener's ear when said listener is seated in said automobile seat.

11. The stereophonic pillow speaker system according to claim 1 wherein said pillow means comprises a base portion for supporting one of the ends of each of said first and second baffle frames, a resilient bowed portion secured to said base portion and cooperating therewith to form first and second spaced apart chambers for receiving said first and second baffle frames respectively, and first and second baffle support members in said first and second chambers respectively for positioning the opposite ends of said first and second baffle frames at an angle relative to each other.

12. The stereophonic pillow speaker system according to claim 11 wherein one of the ends of said first and second baffle support members are secured to said opposite ends of said first and second baffle frames respectively, and the opposite ends of said first and second baffle support members are secured to said base portion, and said first and second baffle frames and said resilient bowed portion cooperate to form a recess for receiving a listener's head therein between said first and second baffle frames.

13. The stereophonic pillow speaker system according to claim 1 further including an equalizer circuit means having one channel circuit which includes (1) a first resistor connected in series with one channel of said amplifier and one of said loud speakers, (2) a first capacitor connected in parallel with said first resistor for shunting said first resistor, and (3) a second capacitor and a second resistor connected in series with each other and and parallel with one of said loud speakers for flattening the acoustic output of said one of said loud speakers; and having another channel circuit which includes (1) a third resistor connected in series with the other channel of said amplifier and the other of said loud speakers, (2) a third capacitor connected in parallel with said third resistor for shunting the third resistor and (3) a fourth capacitor and a fourth resistor connected in series with each other and in parallel with said other of said loud speakers for flattening the acoustic output of said other of said loud speakers; and further having a bridging resistor between said speakers for providing mixing of the electrical input signals from said channels of said amplifier for reducing any out-of-phase rumble delivered by said amplifier.

14. A pillow speaker system comprising:

a. a first baffle frame;

b. at least one loudspeaker mounted on said baffle frame in cooperative relationship with said baffle frame to derive a first near field effect proximal to said one loudspeaker in response to an electrical signal applied to said one loudspeaker from a signal source;

c. a second baffle frame;

d. at least one other loudspeaker mounted on said second baffle frame in cooperative relationship with said second baffle frame to derive a second near field effect proximal to said other loudspeaker in response to said electrical signal applied to said one other loudspeaker from said signal source;

e. pillow means for resiliently isolating said first and second baffle frames in spaced relationship and for positioning said baffle frames at an angle relative to each other so that one ear of said listener is in registry with said first near field effect and the other ear of said listener is in registry with said second near field effect when said listener's head is disposed between said first and second baffle frames; and f. said pillow means includes resilient means for isolating mechanical vibrations from said first and second baffle frames to said listener's head.

15. A stereophonic pillow speaker system comprising:

a. a first baffle frame;

b. a loudspeaker mounted on said first baffle frame and connected to an electrical signal from one channel of an amplifier;

c. a second baffle frame;

d. a loudspeaker mounted on said second baffle frame and connected to an electrical signal from another channel of an amplifier;

e. pillow means resiliently isolating said first and second baffle frames in spaced relationship and positioning said baffle frames at an angle relative to each other so that one ear of a listener is proximal to one of said loud speakers and the other ear of the listener is proximal to the other of said loudspeakers when said listener's head is disposed between said first and second baffle frames;

f. each of said baffle frames extending sufficiently beyond said loudspeaker mounted thereon that the path of the back waves produced by said loudspeaker to said listener's ear proximal thereto is between 2 and 4 times longer than the path of the front waves produced by said loudspeaker to said ear of said listener to produce a near field effect at each of the respective ears of said listener; and g. said pillow means including resilient means for isolating mechanical vibrations from said first and second baffle frames to said listener's head.

16. The invention defined in claim 12 wherein said path of said back waves is 4 times longer than said path of said front waves.

17. The invention defined in claim 12 wherein said path of said back waves is 2 times longer than said path of said front waves.

18. The invention defined in claim 12 wherein said angle between said baffle frames is between 90° and 120°.

* * * * *